3,763,063
COLOR-STABILIZED POLYCARBONATE COMPOSITION CONTAINING A CADMIUM OR CERIUM SALT OF AN ALKANOIC ACID, AN ALKANOIC ACID AND AN ORGANIC PHOSPHITE
Arnold Factor, Scotia, N.Y., assignor to General Electric Company
No Drawing. Continuation-in-part of abandoned application Ser. No. 215,136, Jan. 3, 1972. This application June 14, 1972, Ser. No. 262,565
Int. Cl. C08g 51/56, 51/58
U.S. Cl. 260—18 TN                    12 Claims

ABSTRACT OF THE DISCLOSURE

A thermally stable, streak-resistant polycarbonate composition comprises an aromatic polycarbonate containing a stabilizing amount of a mixture of (a) a cadmium or certain salt of an alkanoic acid, (b) an alkanoic acid, and (c) an organic phosphite.

This application is a continuation-in-part of my copending, but subsequently abandoned application, Ser. No. 215,136, filed Jan. 3, 1972.

This invention is related to a thermoplastic aromatic polycarbonate composition having excellent resistance to color degradation at elevated temperatures, especially streaking during molding and in particular to a flame-retardant aromatic polycarbonate composition containing a stabilizer effective in preventing discoloration at elevated temperatures especially the production of off-colored streaks during molding.

It is well known in the art to prepare flame-retardant polycarbonate compositions by employing halogen-substituted bisphenol-A in the preparation thereof. Specifically, U.S. Pat. 3,334,154 discloses such a composition wherein tetrabromobisphenol-A is employed to prepare a polycarbonate composition having excellent flame-retardant properties. Flame-retardant properties of thermoplastic compositions are extremely high in demand in the industry as a safety feature requirement. In fact, many applications for thermoplastics carry the requirement that the thermoplastic be flame-retardant, particularly where they are used by the public or are employed in areas where the public may gather.

As thermoplastics, particularly polycarbonates, find greater use in many new applications, there is a definite trend to higher molding temperatures due to the complicated geometry of the part to be molded and/or the molding of thinner walled sections. Higher molding temperatures are necessary in order for the polycarbonate to completely fill the mold cavity and thereby produce a satisfactory molded shape even though complicated in its design. Unfortunately, when employing flame-retardant polycarbonate compositions, as described by the prior art, color degradation of the flame-retardant polycarbonate composition occurs due to these higher molding temperatures being employed. This color degradation or discoloration is generally evidenced by the appearance of unwanted streaks or areas of discolored polymer in the molded part.

It has now been discovered that these problems can be overcome by incorporating the hereinafter described composition as an additive into a flame-retardant aromatic polycarbonate composition. Only a very small, stabilizing amount of the additive needs to be employed. Generally, the amount is in the range of from 0.05 to about 2.0 weight percent of the additive based on the weight of the total polymer composition. Lesser amounts can be used with a consequent loss in effectiveness and larger amounts can be used with no increase in effectiveness and possibly some problems on molding due to splaying, i.e., surface imperfection due to the formation of a film or phase separation on the surface of the molded part. The additive employed herein is a mixture of (a) at least one cadmium and/or cerium salt of an alkanoic acid other than formic, (b) at least one alkanoic acid other than formic, and (c) at least one organic phosphite. Various combinations of the above materials may be employed herein to render the flame-retardant polycarbonate composition color-stable at elevated temperatures. In general, the chain length or number of carbon atoms in the alkanoic acid, either per se or as the cadmium or cerium salt has no effect on the effectiveness of the stabilizer composition. Because they are more readily available, I prefer that the alkanoic acids used per se and as the cadmium and/or cerium salt be those having from 2 to 20 carbon atoms and preferably 6 to 20 carbon atoms.

A further advantage to using the above composition is that they are soluble in the polycarbonate resins thereby permitting transparent molded objects to be made from the flame-retardant stabilized polycarbonates. Many of the prior stabilizers could only be used to make translucent or opaque molded objects because of their limited or complete insolubility in the polymer.

I have found that when I make the stabilizer composition and heat it to about 100° C. that equilibration occurs resulting in disappearance or decrease in the amount of free alkanoic acid present. Where the acyl moiety of the cadmium or cerium salt and the free acid are the same, no equilibration between these two reactants would be noticed. However, when the acyl moieties are different, equilibration does occur, but this does not result in a decrease in the amount of acid. The decrease is caused by equilibration between the phosphite and the acid with the formation of an ester of the phenol or alkanol moiety of the phosphite and the acyl moiety of the alkanoic acid. For example, when diphenyl decyl phosphite, cadmium 2-ethylhexanoate and 2-ethylhexanoic acid, in the ratio of 1.5 moles of the phosphite to 1 mole of the salt and 3 moles of the acid, are heated at 100° C. for 4 hours, the acid can no longer be detected and large amounts of phenyl 2-ethylhexanoate and a smaller amount of decyl 2-ethylhexanoate is found in the mixture. Equilibration also occurs but more slowly, if the three ingredients are mixed and allowed to stand at ambient temperature. This same equilibration reaction is believed to occur during extrusion and/or molding if the three ingredients are added to the polycarbonate without prior heating or equilibration. Preferably, the amount of alkanoic acid initially used should not be greater than the amount that can be esterified by the phosphite during equilibration.

It is believed that color degradation as exhibited by streaking of the molded part is due to the thermal instability of the flame-retardant composition when exposed to the elevated temperatures during molding. As stated previously, it has now been discovered that this streaking effect or thermal instability can now be relieved or reduced substantially by incorporating the particular additive disclosed above with the flame-retardant polycarbonate composition.

The flame-retardant aromatic polycarbonate employed herein may be either (a) homopolycarbonates of a halogen substituted dihydric phenol, (b) copolycarbonates of a dihydric phenol free of halogen substituents and a halogen-substituted dihydric phenol, (c) mixtures of (a) and (b), or (d) mixtures of (a) and/or (b) with homopolycarbonates of a dihydric phenol free of halogen substituents. Preferably, the mixture may be 30–99 weight percent and more particularly 70–99 weight percent of a homopolycarbonate of a dihydric phenol free of halogen substituents and, correspondingly, 70–1 weight percent and more particularly, 30–1 weight percent of a copolymer of (1) 75–25 weight percent of a halogen substituted dihydric phenol and, correspondingly, (2) 25–75 weight percent of a dihydric phenol free of halogen substituents. The weight percent of the above is based on the total weight of the polymers in the mixture. More particularly, the preferred system above employs chloro- and/or bromo-substituted (preferably bromo-substituted) dihydric phenols.

In general, the halogen-free and halogen-substituted dihydric phenols employed herein are dihydric bisphenols or polynuclear aromatic compounds, containing as functional groups, two hydroxyl radicals, each of which is attached directly to a carbon atom of an aromatic nucleus. Typical, but not limiting, of some of the dihydric phenols that may be employed in the practice of this invention are bis(4-hydroxyphenyl)methane, 2,2-bis(4-hydroxyphenyl)propane (bisphenol-A), 2,2 - bis(4-hydroxy-3-methylphenyl)propane, 4,4-bis(4-hydroxyphenyl)heptane, 2,2 - bis(3,5-dichloro-4-hydroxyphenyl)propane (tetrachlorobisphenol-A), 2,2-bis(3,5-dibromo-4-hydroxyphenyl)propane (tetrabromobisphenol-A), bis(3-chloro-4-hydroxyphenyl)methane, etc. Other suitable dihydric phenols are also available and are disclosed, for example, in U.S. Pats. 2,990,835, 3,028,365 and 3,334,154.

Generally, the polycarbonate employed herein can be prepared by any of the processes known in the art, for example, by reacting a dihydric phenol with a carbonate precursor in the presence of a molecular weight regulator, if desired, an acid acceptor and a catalyst. The preferred carbonate precursor generally employed in preparing carbonate polymers is carbonyl chloride also known as phosgene. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

The cadmium and cerium salts of alkanoic acids employed herein can be any of the salts such as cadmium or cerium 2-ethylhexanoate (cadmium or cerium octanoate), cadmium or cerium laurate, cadmium or cerium stearate, cadmium or cerium decanoate, cadmium or cerium acetate, cadmium or cerium cyclohexanecarboxylate, cadmium or cerium palmitate, cadmium or cerium eicosonoate, cadmium or cerium butyrate, etc. The preferred salts employed herein are cadmium or cerium 2-ethylhexanoate. The alkanoic acids can be any of the above acids forming the above cadmium and cerium salts. Since in forming these salts, excess acid is generally used, the acyl moiety of the alkanoic acid and of the cadmium or cerium salt are generally the same.

The phosphites that are employed in the practice of this invention have the formula:

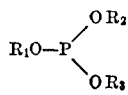

wherein $R_1$, $R_2$ and $R_3$ are independently selected from the group consisting of hydrogen, alkyl, aryl, cycloalkyl, arylalkyl and alkylaryl radicals wherein at least one R is other than hydrogen. Preferably the radicals have 1 to 20 carbon atoms. The alkyl may be methyl, ethyl, propyl, isopropyl, the various butyl isomers, e.g., butyl, sec.-butyl, tert.-butyl, the various amyl isomers, the various hexyl isomers, the various nonyl isomers, the various eicosyl isomers, etc.; the cycloalkyl may be cyclobutyl, cyclopentyl, cyclohexyl, 2-methylcyclohexyl, 4-methylcyclohexyl, 2-ethylcyclohexyl, 4-ethylcyclohexyl, 4-isopropylcyclohexyl, etc.; the aryl may be phenyl, 1-naphthyl, 2-naphthyl, biphenylyl, terphenylyl, etc.; the aralkyl may be any of the above alkyls substituted with one or more of the above aryl groups, e.g., benzyl, phenylethyl, 1-phenylpropyl, etc.; and the alkaryl may be any of the above aryls substituted with one or more of the above alkyls, e.g., o-tolyl, xylyl, cumyl, mesityl, butylphenyl, nonylphenyl, etc. Typical of some of the phosphites that can be employed in the practice of this invention are diphenyl dodecyl phosphite, diphenyl phosphite, triphenylphosphite, di-(t-butylphenyl)octyl phosphite, triethyl phosphite, tris(nonylphenyl)phosphite, dipropyl phenyl phosphite, etc. The preferred phosphites to be employed herein are diaryl phosphites, e.g., diphenyl phosphite, etc., and diaryl alkyl phosphites, e.g., diphenyl decyl phosphite, etc.

The additive employed in the practice of this invention is a mixture as set forth previously. The amounts of the component parts of the mixture may vary from about 0.5 to 3 moles of the phosphite component of the mixture per mole of the cadmium or cerium salt. The amount of alkanoic acid can be varied from 0.5 to 3 moles per mole of the phosphite compound. Preferably, the mixture employed herein is essentially 3 moles of the alkanoic acid and 1.5 moles of the phosphite per mole of cadmium or cerium alkanoate.

In order that those skilled in the art may understand my invention, the following examples are given by way of illustration and not by way of limitation. Unless otherwise specified, parts and percentages are by weight.

EXAMPLE 1

A standard test molding composition was prepared by mixing (a) 1 part of a copolymer prepared by reacting 50 weight percent of 2,2-bis(4-hydroxyphenyl)propane, also known as isopropylidene-p,p′-biphenol (hereinafter referred to as bisphenol-A), 50 weight percent of 2,2-bis(3,5-dibromo-4-hydroxyphenyl)propane and phosgene in a methylene chloride reaction medium containing therein p-tert-butylphenol, pyridine and calcium hydroxide, and (b) 4 parts of a bisphenol-A homopolymer prepared by reacting bisphenol-A with phosgene in a methylene chloride reaction medium containing therein triethylamine, p-tert-butylphenol and calcium hydroxide. After these polymers are recovered from solution in solid form and dried overnight at 125° C., they are blended with 0.042 part titanium dioxide pigment and extruded at a temperature of about 525° F. The extrudate is comminuted into pellets.

The above composition is then injection molded into test specimens of 3″ x 2″ x 0.125″ thick at a molding temperature of 740° F.

Severe color degradation occurs as observed by the dark streaks appearing in the discolored molded shape. In addition, the molded specimens are brittle compared to the nonbromine containing polycarbonate and frequently break as they are ejected from the mold.

The following table gives the composition and percentages of the stabilizers incorporated in the above test polymer by blending with the polymer before the extrusion to form the pellets and the comparison of the molded test pieces with the test piece from Example 1.

TABLE

| Ex. | Composition of stabilizer system [a] [b] (wt. percent) | Result [d] |
|---|---|---|
| 2 | 0.2% CdOct [c] plus 0.143% DPDP | +++ |
| 3 | 0.1% CdOct [c] plus 0.143% DPDP | ++ |
| 4 | 0.2% CdOct [c] plus 0.07% DPDP | + |
| 5 | 0.5% DPDP | 0 |
| 6 | 0.5% DPP | — |
| 7 | 0.5% CdOct [c] | — |
| 8 | 0.2% phenyl-2-ethylhexanoate | — |
| 9 | 0.114% OctOH plus 0.143% DPDP | 0 |
| 10 | 0.2% CdOct [c] plus 0.21% tridecylphosphite | +++ |
| 11 | 0.2% CdOct [c] plus 0.11% TPP | + |
| 12 | 0.17% CdOct plus 0.19% TPP plus 0.14% OctOH | +++ |
| 13 | 0.2% CdOct [c] plus 0.10% DPP | +++ |
| 14 | 0.2% CdOct [c] plus 0.06% trimethylphosphite | + |
| 14 | 0.24% CdSter plus 0.22% DPDP | ++ |
| 16 | 0.24% CdSter plus 0.22% DPDP plus 0.15% OctOH | ++ |
| 17 | 0.24% CdSter plus 0.15% DPP | + |
| 18 | 0.24% CdSter plus 0.15% DPP plus 0.15% OctOH | ++ |
| 19 | 0.25% CeOct [c] plus 0.15% DPP plus 0.10% xylene | +++ |
| 20 | 0.08% Cd acet plus 0.22% DPDP | — |
| 21 | 0.08% Cd acet plus 0.22% DPDP plus 0.15% OctOH | +++ |
| 22 | 0.08% Cd acet plus 0.15% DPP plus 0.15% OctOH | +++ |
| 23 | 0.08% Cd acet | — |

[a] Mixtures preheated at 212° F. for 30 minutes prior to formulation.
[b] Key: CdOct—cadmium 2-ethylhexanoate; OctOH—2-ethylhexanoic acid; CdSter—cadmium stearate; Cd acet—anhydrous cadmium acetate; CeOct—cerium 2-ethylhexanoate; DPDP—diphenyldecylphosphite; DPP—diphenylphosphite; TPP—triphenylphosphite.
[c] Salts contained ~50% free 2-ethylhexanoic acid.
[d] Key: +++=excellent streak inhibition; ++=good streak inhibition; +=some streak inhibition; 0=no effect; —=worse streaking and color.

It is evident from the above results that all three components of the initial stabilizer mixture are necessary. Although Example 17 does show improvement in the absence of free acid, further improvement is shown in Example 18 when free acid is present. In Examples 11 and 12 the difference in results is due to the fact that 2 moles of acid per mole of triphenylphosphite was used in Example 11 whereas 3 moles of acid per mole of triphenylphosphite was used in Example 12.

EXAMPLE 22

Equally good results were obtained when the stabilizer of Example 2 was used in a flame-retardant polycarbonate composition which was the same as that of Example 1 except that tetrachlorobisphenol-A was used in place of the tetrabromobisphenol-A in an amount to give an 11.1% chlorine content in the blended polymer.

Although the above examples and teachings have illustrated many of the variations and modifications that can be made in the practice of my invention, nevertheless other variations and/or modifications will be apparent to those skilled in the art. For example, various dyes, pigments, extenders, flow modifiers, fillers, etc., can be incorporated in the polymers. Although the polymers of this invention have been described in terms of their use in making of flame-retardant molded parts, they can also be used to produce other useful shapes such as sheets, rods, films, etc. It is to be understood that changes can be made in the particular embodiments of the invention described which are within the full intended scope of the invention as defined by the appended claims.

What I claim as new and desire to secure by Letters Patent of the United States is:

1. A color-stabilized, flame-retardant carbonate polymer comprising an aromatic, halogen-containing carbonate polymer containing a stabilizing amount of an equilibrated mixture of a cadmium or cerium salt of a $C_{2-20}$ alkanoic acid, a $C_{2-20}$ alkanoic acid and a phosphite having the formula:

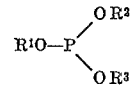

where $R^1$, $R^2$, and $R^3$ are individually selected from the group consisting of hydrogen, $C_{1-20}$ alkyl, phenyl and $C_{1-20}$ alkyl substituted phenyl wherein at least one R is other than hydrogen.

2. The composition of claim 1, wherein said salt is a cadmium salt.

3. The composition of claim 1, wherein said aromatic carbonate polymer is selected from the group consisting of (1) a copolycarbonate of a dihydric phenol free of halogen substituents and a halogen-substituted dihydric phenol, and (2) a blend consisting of (1) with a homopolymer of dihydric phenol free of halogen substituents.

4. The composition of claim 3, wherein the halogen-substituted dihydric phenol is a bromo-substituted dihydric phenol.

5. The composition of claim 1, wherein the aromatic polycarbonate is a mixture of 30–99 weight percent of a homopolymer of a dihydric phenol free of halogen substituents and, correspondingly 70–1 weight percent of a copolymer of 25–75 weight percent of a dihydric phenol free of halogen substituents and 75–25 weight percent of a tetrahalo dihydric phenol.

6. The composition of claim 5, wherein the tetrahalo dihydric phenol is a tetrabromo dihydric phenol.

7. The composition of claim 5, wherein the dihydric phenol free of halogen substituents is a bis(hydroxyphenyl)alkane and the tetrahalo dihydric phenol is a bis(hydroxydibromophenyl)alkane wherein the alkane moieties have from 1 to 8 carbon atoms.

8. The composition of claim 7, wherein the acyl moiety of the alkanoic acid and the metal salt and the R substituents of the phosphite, other than hydrogen, each have at least 6 carbon atoms.

9. The composition of claim 8, wherein the phosphite is diphenyl phosphite.

10. The composition of claim 8, wherein the phosphite is tridecyl phosphite.

11. The composition of claim 8, wherein the phosphite is diphenyl decyl phosphite.

12. The composition of claim 8, wherein the phosphite is triphenyl phosphite.

References Cited
UNITED STATES PATENTS

| 3,622,538 | 11/1971 | Green | 260—45.7 |
| 3,305,520 | 2/1967 | Fritz et al. | 260—45.7 |
| 3,320,210 | 5/1967 | Caldwell et al. | 260—45.75 |
| 3,274,156 | 9/1966 | Perry et al. | 260—18 |
| 3,597,390 | 8/1971 | Miller | 260—47 |
| 3,424,703 | 1/1969 | Jones, Jr. | 260—18 |
| 3,274,135 | 9/1966 | Norman et al. | 260—45.75 |

DONALD E. CZAJA, Primary Examiner

E. C. RZUCIDLO, Assistant Examiner

U.S. Cl. X.R.

260—45.7 P, 45.75 R, 45.85 R, 47 XA